Oct. 9, 1928.

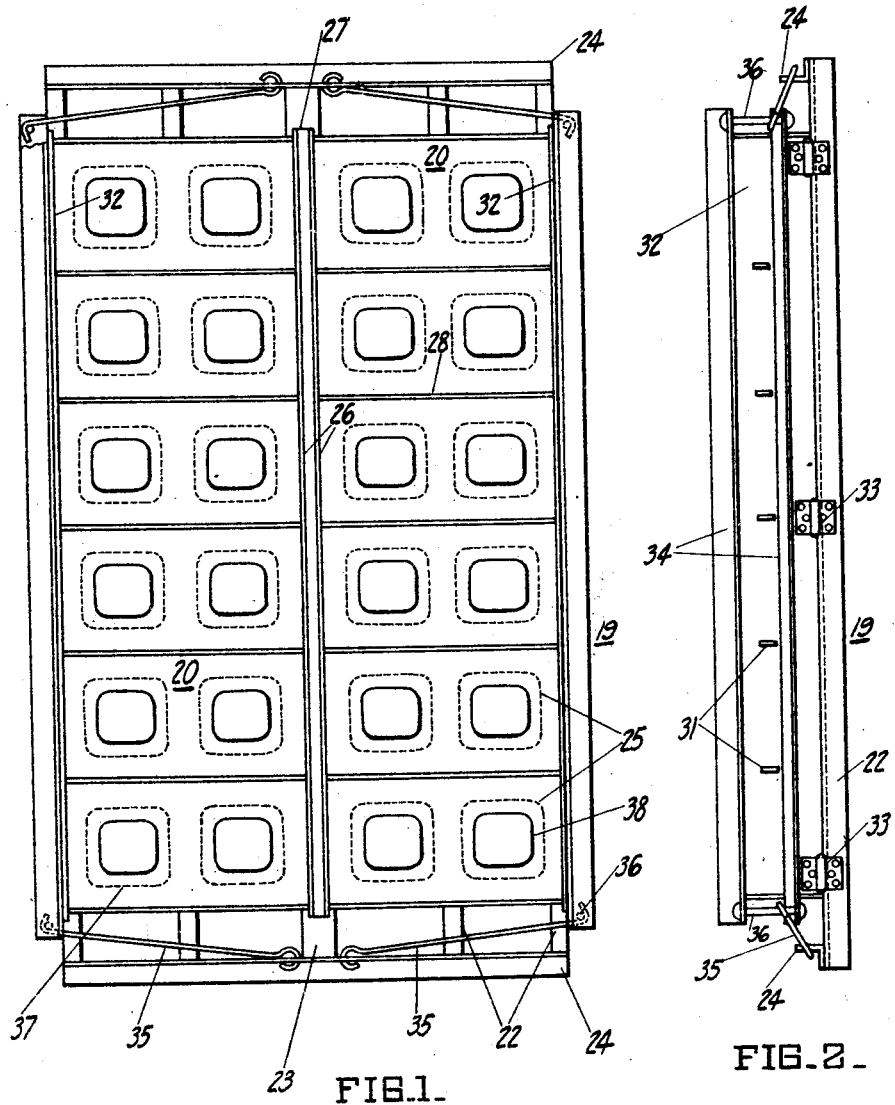

S. FLAM 1,687,010

MULTIPLE MOLD

Filed Jan. 4, 1926  2 Sheets-Sheet 2

INVENTOR
Stephen Flam
BY John Flam
HIS ATTORNEY

Patented Oct. 9, 1928.

1,687,010

UNITED STATES PATENT OFFICE.

STEPHEN FLAM, OF WALNUT PARK, CALIFORNIA, ASSIGNOR TO SUPERTILE MACHINERY CORPORATION, OF LOS ANGELES, CALIFORNIA, A CORPORATION OF CALIFORNIA.

MULTIPLE MOLD.

Application filed January 4, 1926. Serial No. 79,158

This invention relates to the art of molding plastic material such as concrete, cement, or the like, and more particularly it relates to the manufacture of artificial stone products adapted for building material, pipes, conduits, or the like.

In a prior application filed Feb. 19, 1925, in my name, entitled "Process and apparatus for molding" and having Serial Number 10,265, I describe a system whereby cored articles, such as building blocks, can be expeditiously molded by the aid of multiple molds. These molds are shown as having a series of apertures in the bottom plate thereof, through which cores are projected. In accordance with that system, a nest of cores is carried by a vertically movable platform with the axes of the cores vertical; and the multiple mold nests over the cores and likewise rests upon the vertically movable structure. After filling the molds, the vertically movable structure is lowered so as to deposit the mold in a curing space, while simultaneously, the cores are also withdrawn by this vertical movement. All this is described and claimed in the prior application.

In order to vary the size of the material or product that is cast, it is merely necessary to change the nest of cores and its cooperating molds. In some instances, however, it is desirable to retain the size of the product and alter the size of the cores. Such a condition sometimes arises when certain building ordinances must be met by the product or block, as regards thickness of web. Of course this could be taken care of by utilizing a different mold for each different size of web or thickness of material desired; yet with the aid of my invention, it is possible to adjust the size of the apertures in the mold in an extremely simple manner, and with the aid of relatively inexpensive parts. It is accordingly one of the objects of my invention to make it possible to adjust expeditiously the size of the aperture corresponding to the cored holes in the finished product.

Another object of my invention is to provide an inexpensive mold structure adjustable so that it can be used for producing a large variety of cored blocks or tiles, and in connection with varying sizes of cores.

My invention possesses many other advantages, and has other objects which may be made more easily apparent from a consideration of one embodiment of my invention. For this purpose I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawings:

Figure 1 is a plan view of a mold constructed in accordance with my invention;

Fig. 2 is a side elevation thereof, and

Figure 3:
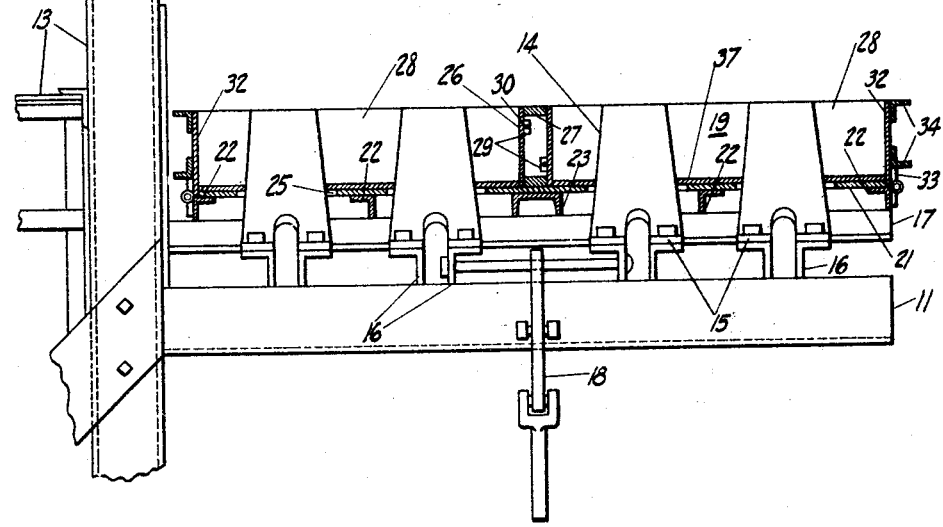
Fig. 3 is a sectional view of the mold, as well as a view of a core structure adapted to cooperate therewith, and a portion of the movable structure upon which the nest of cores and the multiple mold are supported.

The platform upon which the mold pallets and cores are supported is illustrated mainly in a diagrammatic fashion, since it may be substantially identical in structure and use with that disclosed in my earlier application. There are two angle iron supports 11 (Fig. 3), fastened to a moving chain mechanism, which is illustrated partially at 12, near the top of Fig. 3. The structural iron elements 13, forming a general support for all of the parts, are components of a movable truck structure, whereby the molds may be transported to a filling station and later to a curing space, where the supports 11 can be lowered so as to deposit the mold and simultaneously to withdraw the cores. However, my present invention is not necessarily limited to such a movable system for its advantages are not destroyed when used with other mold systems.

Supported on the angles 11 are a plurality of cores 14. These cores have ears 15 by the aid of which they may be fastened to a series of longitudinally extending angles 16, forming a grid. These angles rest in this instance directly upon the supporting angles 11, and are held in proper spaced relation by the aid of several transverse angles 17, passing through the lower portions of cores 14. A catch mechanism 18 serves to hold the nest of cores thus formed, securely in place. All this mechanism, as thus far described, has been set forth in detail in my prior application, and since the present invention is not in any manner dependent upon the details of the core structure, further description of this part of the mechanism is unnecessary.

Nesting over the cores 14 there is a multiple pallet 19, shown in greater detail in Figs. 1 and 2. In the present instance, twelve separate and distinct mold spaces 20 are shown in the multiple mold pallet for casting hollow tile each having a pair of square apertures. There is an apertured bottom plate 21, to the bottom of which are fastened the stiffener bars 22 and 23, conveniently formed from angle irons and channels. These project slightly beyond the plate 21 as clearly indicated in Fig. 1. A pair of transverse angles 24, one at each end, is also provided to serve as an anchor for parts to be hereinafter described.

The bottom plate 21 is provided with a series of apertures 25 which agree in spacing with that of cores 14, but which, in size, correspond to the largest size of cores that are to be used in connection with the mold 19. When so used in connection with the largest size of cores, the plate 21 forms the bottom surface of the mold compartments 20. The manner in which the sides of these compartments are formed will now be described.

The plate 21 as shown, is of sufficient width to form a pair of rows of mold spaces 20. In order to provide the partition wall between these rows, I provide a pair of sheet metal strips 26, extending longitudinally of the plate 21, and spaced apart by the bars 27, forming a rigid part of the structure. The separating plates 28 have projections or ears 29, which extend into the space formed between the two plates 26, through slots formed in said plates. Locking wires 30 serve to anchor these separating plates permanently in place, but the projections 29 have sufficient clearance in the slots to permit the plates 28 to be moved slightly sidewise, so as to free them from the finished produce when unloading the mold.

The free ends of plates 28 are likewise provided with projections or ears 31 (Fig. 2) which are arranged to be accommodated in appropriate slots in the two side plates 32. These side plates form the remaining walls of the mold, and are hinged at their bottom edges to the outer angles 22, as by the aid of the butt hinges 33. Stiffener bars 34 can if desired be used.

In order to hold the sides 32 in position for pouring, I provide a pair of hooks 35 at each end of the mold, which are anchored in the transverse rod 24, and which engage pins 36 supported between bars 34. To open the mold, it is merely necessary to detach hooks 35 and to permit plates 32 to drop down, and the mold can then be easily emptied.

When the product to be cast is to have the largest size cored holes in it, the bottom plate 21 is utilized to provide the bottom of the mold spaces 20, and a nest of the large cores is accordingly used on the structure 11. Now in case the thickness of the web in the product is to be increased without varying the external dimensions of the product, smaller cores, such as 14, must be used. To provide a bottom plate 37 for the molds having smaller apertures 38, all that is necessary to do is to slip the plate 37 underneath the separating plates 28, and directly over the plate 21. A pair of such plates is used for each mold, each plate corresponding to one row of molds; the width being just sufficient, as shown in Fig. 3, to be accommodated between plate 26 and plate 32. The weight of the plates 28 is sufficient ordinarily to keep the plate 37 in place; if not, it is a simple matter to provide a detachable fastening. Since plate 37 is thin, there is sufficient clearance between the projections 31, and their slots to permit this insertion.

Several sets of such plates as 37 can be furnished, each having its distinctive core opening 38, whereby any smaller size of core than the maximum size can be used in the same mold. In this way, an adjustable mold is obtained. The change in size can be speedily and inexpensively accomplished. Furthermore, as the cores are removed by a downward movement, there is never any substantial force urging the plate 37 away from plate 21.

I claim:

1. In a mold structure, an apertured plate forming the bottom of a mold, means forming the sides of the mold, including a pair of loosely anchored plates, and a detachable apertured plate inserted between the said bottom apertured plate and said loosely anchored plates, for permitting any desired smaller size of core to be used than that corresponding to the aperture in the said bottom plate.

2. In a multiple mold structure, an apertured plate forming the bottom of a mold, a central partition for forming a pair of rows of mold spaces, a series of separating plates, each loosely anchored at one edge in said partition, some extending on one side of the partition, and some on the other, a pair of removable side plates paralleling the partition and completing the sides of the mold, and a pair of detachable plates corresponding to each row of the mold spaces and resting on the bottom plate and below the loosely anchored plates, said detachable plates having apertures corresponding in spacing to the apertures in the bottom plate, but of smaller size.

In testimony whereof I have hereunto set my hand.

STEPHEN FLAM.